US012533199B2

(12) United States Patent
Tomov et al.

(10) Patent No.: US 12,533,199 B2
(45) Date of Patent: Jan. 27, 2026

(54) DENTAL ROBOT HELMET

(71) Applicants: Martin Lyubomirov Tomov, Decatur, GA (US); Lubomir Tomov, Sofia (BG)

(72) Inventors: Martin Lyubomirov Tomov, Decatur, GA (US); Lubomir Tomov, Sofia (BG)

( * ) Notice: Subject to any disclaimer, the term of this patent is extended or adjusted under 35 U.S.C. 154(b) by 387 days.

(21) Appl. No.: 18/346,489

(22) Filed: Jul. 3, 2023

(65) Prior Publication Data
US 2024/0008941 A1 Jan. 11, 2024

Related U.S. Application Data

(60) Provisional application No. 63/358,266, filed on Jul. 5, 2022.

(51) Int. Cl.
| | |
|---|---|
| *A61B 6/51* | (2024.01) |
| *A61B 6/00* | (2006.01) |
| *A61B 6/04* | (2006.01) |
| *A61B 34/10* | (2016.01) |
| *A61B 34/20* | (2016.01) |
| *A61B 34/30* | (2016.01) |
| *A61B 34/32* | (2016.01) |
| *A61C 7/02* | (2006.01) |

(52) U.S. Cl.
CPC ............ *A61B 34/32* (2016.02); *A61B 6/0421* (2013.01); *A61B 6/44* (2013.01); *A61B 6/4405* (2013.01); *A61B 6/51* (2024.01); *A61B 34/10* (2016.02); *A61B 34/20* (2016.02); *A61C 7/02* (2013.01); *A61B 2034/107* (2016.02); *A61B 2034/2055* (2016.02)

(58) Field of Classification Search
CPC .......... A61B 6/51; A61B 34/20; A61B 34/30; A61C 7/02
USPC ......................................... 362/572
See application file for complete search history.

(56) References Cited

U.S. PATENT DOCUMENTS 7,742,562 B2 * 6/2010 Weber .................. A61B 6/0487
378/68
11,589,933 B2 * 2/2023 Esterberg ........... A61B 17/1615

FOREIGN PATENT DOCUMENTS

WO WO-2018084869 A1 * 5/2018 ............. A61B 90/39

* cited by examiner

*Primary Examiner* — Toan C Ly

(57) ABSTRACT

A system comprising a helmet configured to be secured on a subject for a medical procedure. A plurality of sensors is coupled to the helmet and configured to generate image data representing a region of the subject. A controller is coupled to the helmet and configured to generate processed image data configured to control a robot during the medical procedure. A housing is coupled to the helmet and configured to house medical instruments for automatic access by the robot during the medical procedure.

19 Claims, 4 Drawing Sheets

DENTAL ROBOT HELMET

RELATED APPLICATION

This application claims the benefit of U.S. Patent Application No. 63/358,266, filed Jul. 5, 2022.

TECHNICAL FIELD

The present invention relates generally to medical robots and, more particularly, to a helmet configured to automate, increase precision and reduce operation time for novel and conventional dental procedures involving surgical robots.

BACKGROUND

Conventional dental procedures are performed manually by a dentist, who is an expert in a specialized area, for example orthodontics, braces, fillings, dental implants, surgery, etc. In these scenarios, the surgical procedures are performed manually and can be long and involved, and the patient is generally not immobilized, so the success or failure of the procedure is mostly dependent on the skill and experience of the dentist. Following the procedure, X-ray imaging is used to evaluate and confirm success of the procedure. If the post-factum evaluation shows a need for further corrective action to be taken, the patient is again required to undergo additional sedation and further surgical intervention until the end result is deemed acceptable. Consequently, there is a need for increased automation and precision in dental procedures in order to reduce the time required for a procedure and reduce or eliminate the need for any subsequent corrective action.

There are two types of exposed bones in the human body, fingernails, toenails, and teeth. Teeth in particular are very hard and with defined geometry, which allows them to be successfully worked on using traditional dental methods. These specifically include detailed programming of the procedures by a highly qualified dental surgeon and its subsequent execution by the proposed dental robot-manipulator described here, which will be supervised by a dental assistant. By separating the proposed dental interventions into distinct portions: precision planning, detailed programming steps, and high-precision and speed execution by the dental robot, embodiments described herein eliminate numerous typical risks and complications that are present due to inherently slower manual procedure execution, as is common at this time in the field. Importantly, the pairing between custom software that operates the proposed dental robot and high precision machine parts that constitute the actual robot is at the core of the proposed dental tool.

INCORPORATION BY REFERENCE

Each patent, patent application, and/or publication mentioned in this specification is herein incorporated by reference in its entirety to the same extent as if each individual patent, patent application, and/or publication was specifically and individually indicated to be incorporated by reference.

DETAILED DESCRIPTION

Figure 1:
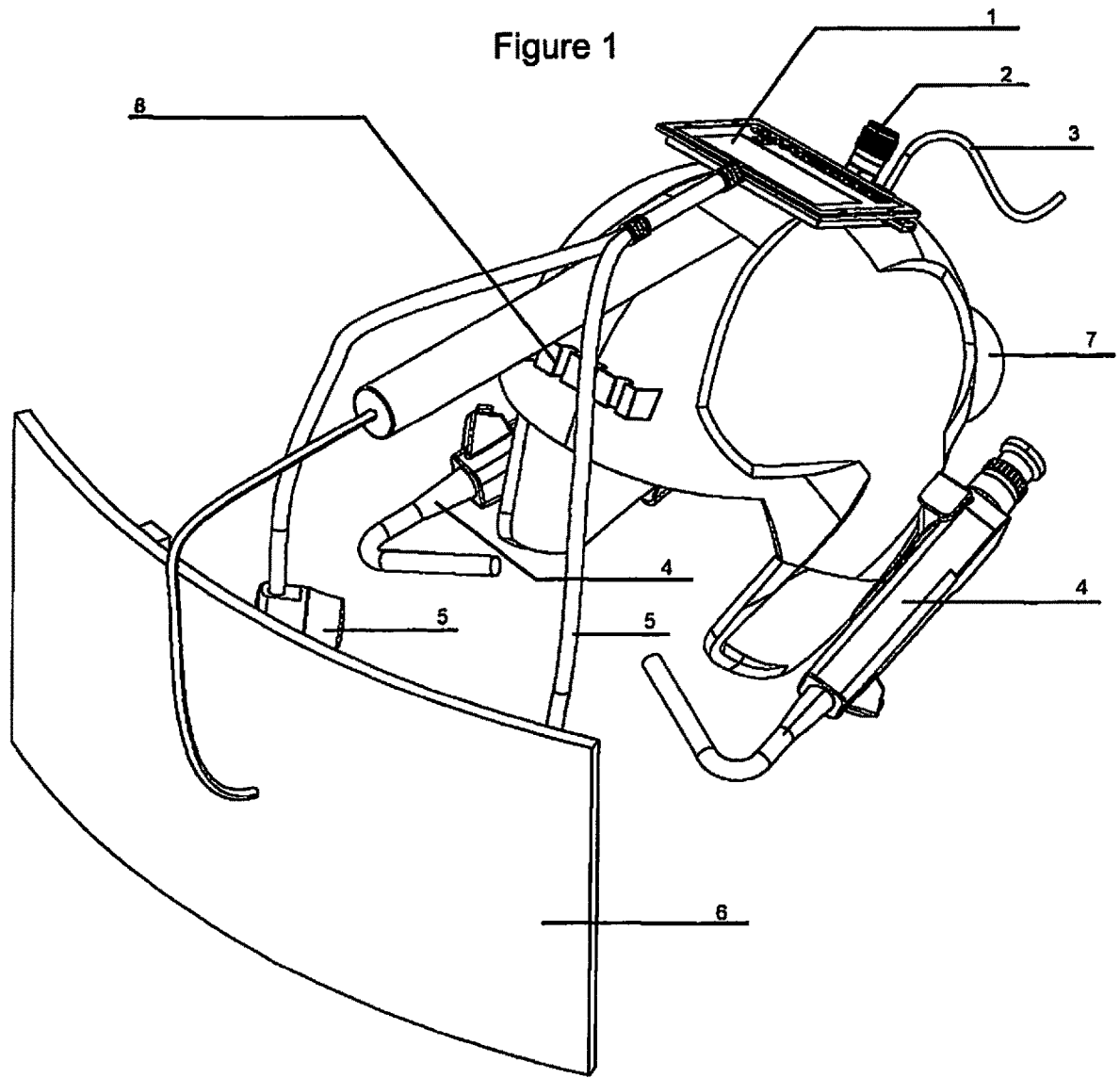
FIG. 1 is a block diagram of a front right perspective view of the dental robot helmet, under an embodiment.

Embodiments described herein provide increased automation and precision in dental procedures in order to reduce the time required for a procedure and reduce or eliminate the need for any subsequent corrective action. There are two types of exposed bones in the human body, fingernails and/or toenails, and teeth. Teeth in particular are very hard and with defined geometry, which allows them to successfully undergo procedures using traditional dental methods. More specifically, these procedures as described herein include detailed programming of a procedure by a highly qualified dental surgeon and its subsequent execution by the dental robot-manipulator described herein and supervised by a dental assistant. By separating the proposed dental interventions into its distinct portions, precise planning, detailed programming, and high-precision, high-speed execution by the dental robot, embodiments described herein eliminate numerous typical risks and complications that are present in dental procedures due to inherently slower manual procedure execution. Importantly, the pairing between custom software that operates the dental robot and high precision machine parts that constitute the actual robot are at the core of the embodiments described herein.

Embodiments provided herein include a dental robot helmet (also referred to herein as the "helmet") configured for use with dental robots in dental procedures in which automation can be incorporated to improve procedure accuracy, shorten procedure duration, and reduce the need for full patient sedation. Generally, the dental robot helmet comprises a helmet including gel-filled cushions configured to be regulated via pressure to secure and manipulate endoscopic instruments and high-resolution three-dimensional ("3D") optic cameras over the procedure space. The helmet includes water pressure and air pressure inlets, as well as an aspirator outlet. A high-resolution 3D X-ray scanner component is included to provide panoramic imaging of the region. Openings for the eyes, ears, and mouth are included in the helmet, and the mouth opening is configured to include a bracket to immobilize and position the mouth in a way that the robot can execute planned operations. A controller and interface connected to a dedicated computer are included and configured to select, plan, and perform dental surgical procedures.

More particularly, the dental robot helmet of embodiments herein comprises a helmet configured to be fitted to a patient's head using an arrangement including a number of gel-filled inflatable pads under controlled pressure. The gel pads enable complete immobilization of the patient's head prior to and during the planned dental procedure. To improve compliance with the patient's head and thus comfort, the helmet has eye and ear openings, and a brace configured to be placed around the patient mouth helps to immobilize the jaws in preparation for the surgical procedure. The helmet is further equipped with a high-resolution 3D X-ray scanner tool configured to provide real-time, uninterrupted control of progress of the procedure, including feedback of alterations to the procedure. The helmet also incorporates systems to provide pressurized air and water to the procedure site, as well as waste removal via aspiration.

The helmet is configured for use with a dental robot having at least one manipulator arm (e.g., two (2) robotic manipulator arms, etc.) (not shown) configured to be controlled with use of motors (e.g., piezo motor, servomotor, etc.) and three-dimensional positional sensors. Each manipulator arm is paired with an integrated high-resolution color camera and light source to enable real time monitoring of the active surgery area. The manipulator arms are configured to automatically connect to the surgical/dental tools. The entire procedure is pre-planned and loaded into the robot, so that it is fully automated from start to finish, including tool swaps, surgical steps, and confirmation checks that the procedure is going according to plan. The robotic arms subsequently access the patient's face from the open regions of the helmet to execute the procedure automatically using the generated 3D map of the patient's face as a reference.

The cameras and X-ray scanner on the helmet are configured for use in generating data to populate a 3D space with data representing the patient's face/mouth that can then be paired with the written surgical intervention procedure. In operation, the entire dental procedure is planned in advance of any surgery, and the surgical robot is programmed with the procedure. The control unit includes a computer or processor programmed to execute the procedure automatically without intervention by the surgeon who, instead, will monitor the progress of the procedure and make decisions regarding progress of the procedure based on the programmed progress checks. The computer and software are configured to enable the surgeon/dentist to assume direct control of the procedure via the robot and dental robot manipulator.

Figure 2:
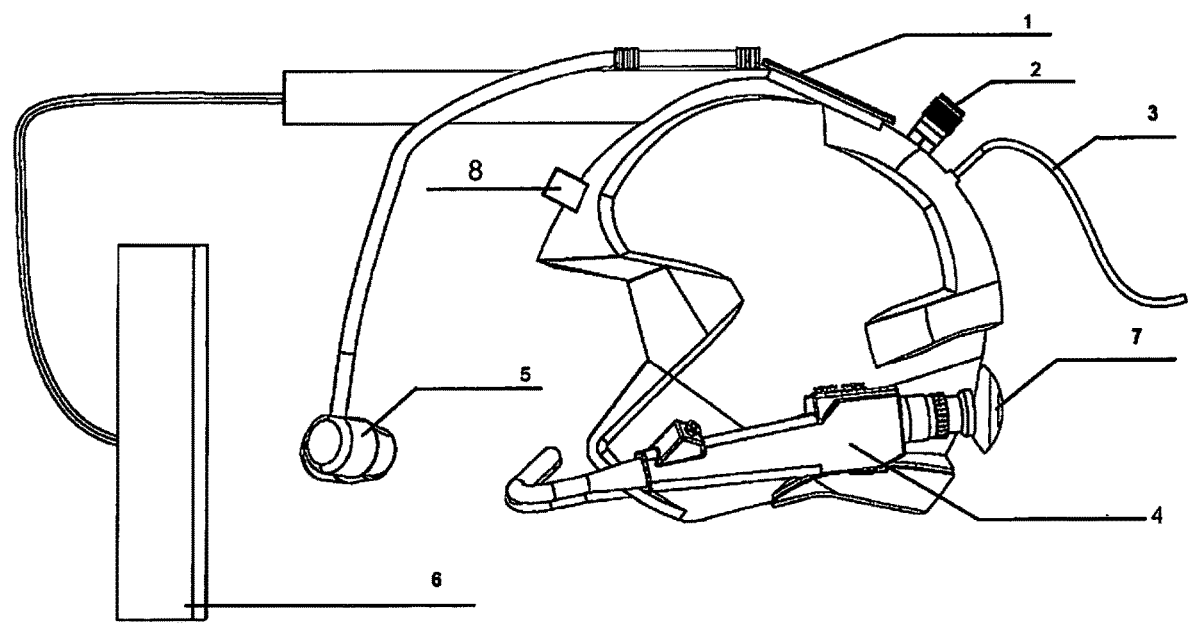
FIG. 2 is a block diagram of a left side view of the dental robot helmet, under an embodiment.

FIG. 1 is a block diagram of a front left perspective view of the dental robot helmet 100, under an embodiment. FIG. 2 is a block diagram of a left side view of the dental robot helmet 100, under an embodiment. With reference to FIG. 1 and FIG. 2, the helmet includes a controller 1, and an interface cable 3 is configured to couple or connect the controller 1 to a control computer (not shown). The control computer can be remote to the helmet or, alternatively, configured as a component of the helmet. The controller and control computer are configured to plan and execute a desired range of dental procedures or interventions using the data collected via the helmet. An assembly 2 is configured for coupling to remote sources of materials useful during dental procedures involving the helmet, sources including but not limited to water, air, and vacuum for aspiration, to name a few.

The helmet further includes storage compartments 4 configured to house or otherwise contain medical endoscopes, and a fixed cartridge 8 for sterile dental instruments planned for use during a procedure including the helmet. A full complement of surgical and dental instruments is placed in sterile compartments (e.g., two (2) compartments, etc.) attached to the outside of the helmet in the fixed cartridge 8 for access by the manipulator arms during the procedure. In this manner, the instruments are readily accessible for use by the robot manipulator arms during the procedure. Each included instrument is modified to include a universal attachment point for use by the manipulator arms to grip and utilize the respective instrument reliably and reproducibly.

The helmet of an embodiment includes 3D cameras 5 with magnification (e.g., 10×, etc.) configured to track the region of the surgery. Further, the helmet includes a 3D X-ray scanner 6 for panoramic imaging of the region including the surgery. A magnetic immobilization component 7 is coupled to the helmet and configured to stabilize the patient's head during the procedure to reduce or eliminate movement of the head. The magnetic component 7 is configured to couple to a point on the surgical/dental chair to stabilize the head and reduce or eliminate random movement. This stabilization is a component of the safety considerations of a procedure and enables the 3D cameras 5 to detect and map patient facial features and run progress checks on the patient during the procedure. Further, as the dental robot executes a program that codes the entire procedure, the magnetic immobilization apparatus limits extraneous movement introduced during the procedure.

Figure 3:
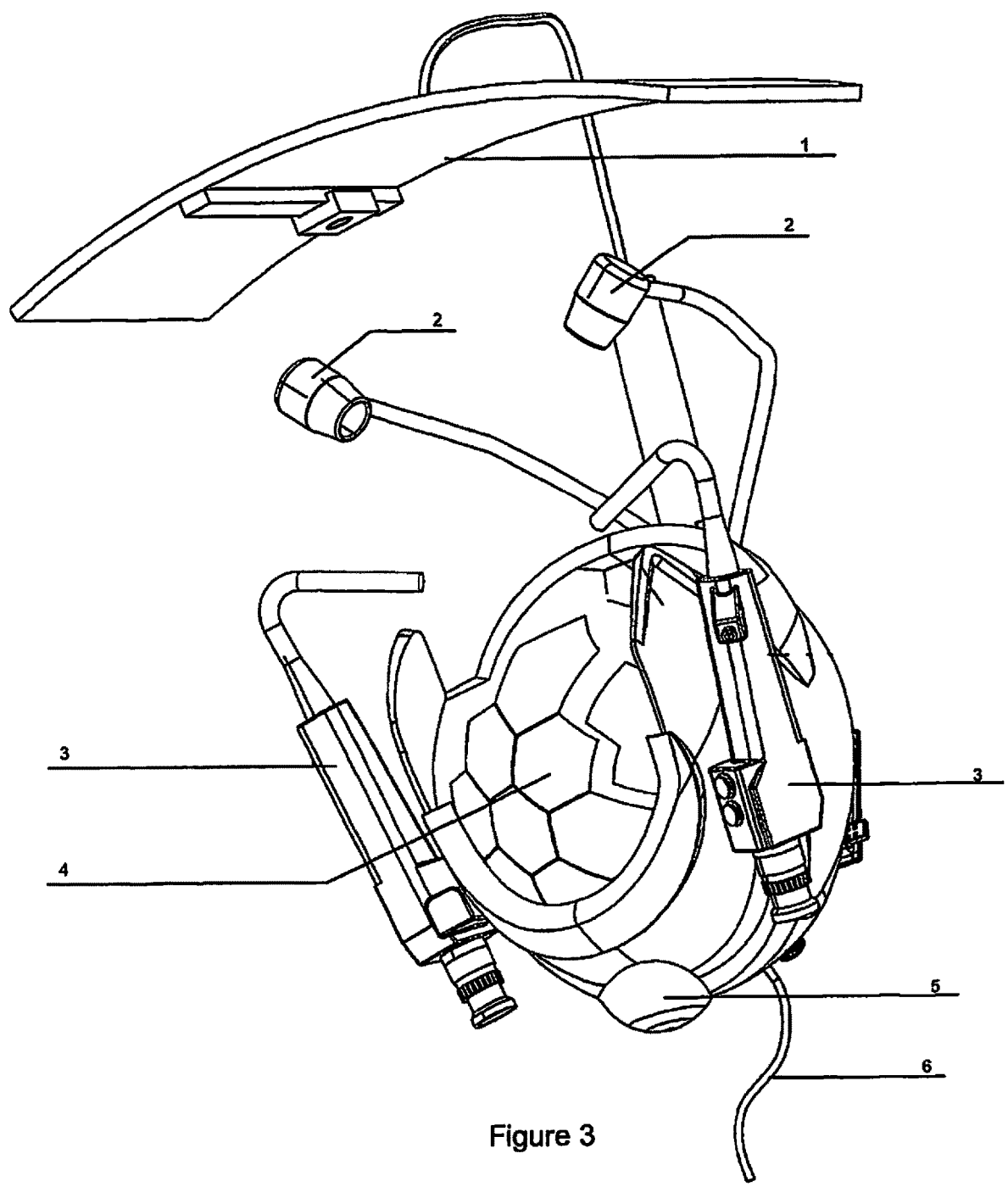
FIG. 3 is a block diagram of a bottom rear perspective view of the dental robot helmet, under an embodiment.

FIG. 3 is a block diagram of a bottom rear perspective view of the dental robot helmet 300, under an embodiment. As described herein, the dental robot helmet is configured to be fitted to a patient's head using an arrangement including a number of gel-filled inflatable pads 4 under controlled pressure. The gel pads enable complete immobilization of the patient's head prior and during the planned dental procedure. A magnetic immobilization component 5 is coupled to the helmet and configured to stabilize the patient's head during the procedure so that it does not move. The magnetic component 5 is configured to couple to a point on the surgical/dental chair to stabilize the head and reduce or eliminate random movement.

As described in detail herein, the helmet includes a controller (not shown), and an interface cable 6 is configured to couple or connect the controller to a control computer (not shown). The controller and control computer are configured to control one or more robot manipulator arms using a dedicated computer configured to plan and then run a desired range of dental interventions. The helmet further includes three-dimensional (3D) cameras 2 with magnification (e.g., 10×, etc.) configured to track the region of the surgery, along with a 3D X-ray scanner 1 for panoramic imaging of the region including the surgery. The helmet is further configured to include storage compartments 3 configured to house or otherwise contain medical endoscopes.

Figure 4:
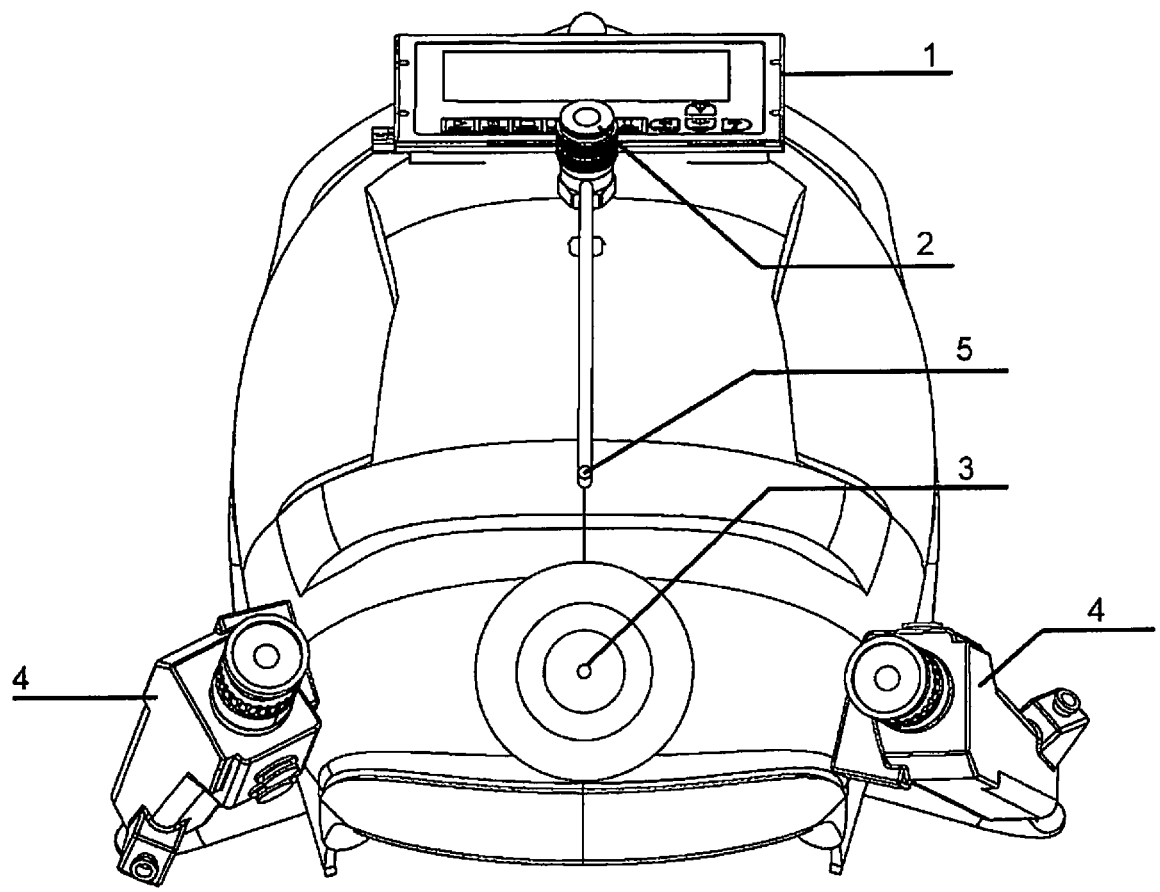
FIG. 4 is a block diagram of a rear view of the dental robot helmet, under an embodiment.

FIG. 4 is a block diagram of a rear view of the dental robot helmet 400, under an embodiment. The helmet includes a controller 1, and an interface cable 5 is configured to couple or connect the controller 1 to a control computer (not shown). The controller and control computer are configured to control one or more robot manipulator arms using a dedicated computer configured to plan and then run a desired range of dental interventions. An assembly 2 is configured for coupling to remote sources of materials useful during dental procedures involving the helmet, sources including but not limited to water, air, and vacuum for aspiration, to name a few. The helmet is further configured to include storage compartments 4 configured to house or otherwise contain medical endoscopes or instruments. A magnetic immobilization component 3 is coupled to the helmet and configured to stabilize the patient's head during the procedure so that it does not move. The magnetic component 3 is configured to couple to a point on the surgical/dental chair to stabilize the head and reduce or eliminate random movement.

A dental procedure involving the dental robot manipulator includes a planning stage and an execution stage. During the planning stage of an embodiment, the dental robot helmet is placed on the patient's head and fixed in placed via the pressure-controlled gel-filled pads. High-resolution images (e.g., 3D X-ray images, camera images, etc.) are taken of regions of the patient's mouth in order to construct a virtual model of the skull and dental area. The virtual model of the patient's skull and mouth are then used to plan and optimize a proposed dental operation. Following acquisition of the images, the patient is released until such time as the dental team is ready to perform the operation. The dental and/or surgical expert subsequently uses the virtual 3D model of the patient's head and mouth to plan a detailed step-by-step dental procedure. The detailed procedure includes steps relating to performing the series of actions making up the procedure and loading the instruments in the manipulator arms necessary for the respective actions making up the procedure. The detailed procedure further includes periodic progress checks executed during the procedure using either the 3D X-ray attachment or the optical cameras to provide information regarding sufficiency of the procedure. Upon completion of the planning stage, the detailed procedure is ready for use during the patient procedure.

The execution stage involves conducting the planned procedure on the patient using the dental robot helmet and robot. The procedure starts with the dental robot helmet being placed on the patient's head and immobilized as described herein, using the pressure-controlled gel-filled pads. When properly in place, the position of the helmet corresponds to the 3D render generated previously and used during the intervention planning stage. The procedure continues with the dental tools being loaded into the robot manipulator arms in the appropriate sequence in accordance with the detailed procedure plan. The dental procedure team then initiates the planned procedure, following each step of the procedure in real time using the 3D X-ray tool and the optical cameras, thereby verifying successful completion of each pre-planned step of the procedure. The dental robot is configured to include an "interrupt" option, capable of being activated at any time during the automated procedure, the activation of which returns control of the robot to the dentist to perform any necessary manual corrections using high spatial resolution piezo-controlled 3D controllers.

Embodiments include a dental robot manipulator assembly comprising a helmet including eye and year openings, a mouth immobilization bracket, and fixed pressure-regulated gel pads. The assembly further includes at least one endoscopic manipulator with a mechanism for automated instrument acquisition, and a control unit configured to pair with a dedicated computer for specialized dental procedure planning and execution. The dental robot manipulator assembly includes at least one high-resolution 3D optic camera and at least one high-resolution 3D X-ray component are included, along with at least one inlet configured to couple to sources of water, air, vacuum (aspiration).

Embodiments include a system comprising: a helmet; an image sensor coupled to the helmet and configured to image a region of a subject; an X-ray scanner coupled to the helmet and configured to collect panoramic images of the region; and at least one fitting coupled to the helmet and configured to couple to at least one remote system providing at least one of air, water, and vacuum.

Embodiments include a system comprising a helmet. An image sensor is coupled to the helmet and configured to image a region of a subject. An X-ray scanner is coupled to the helmet and configured to collect panoramic images of the region. At least one fitting is coupled to the helmet and configured to couple to at least one remote system providing at least one of air, water, and vacuum.

The helmet is configured to be secured on a head of a subject for use in a robotic medical procedure. The helmet includes a plurality of apertures configured for placement adjacent a plurality of features of the head including at least one of eyes, ears, and a mouth.

Embodiments include at least one pad configured to couple to the helmet to immobilize the head relative to the helmet.

The at least one pad comprises an inflatable pad coupled to a pressure source. The pressure source is configured to control an inflation pressure of the at least one pad.

The at least one pad comprises a gel pad.

Embodiments include a brace coupled to the helmet and configured to immobilize a jaw of the subject relative to the helmet.

The region includes a face and mouth of the subject. The mouth includes internal regions and structures of the mouth.

The X-ray scanner and the image sensor are configured to generate image data representing the mouth and the face of the subject. The image data are configured to populate a digital three-dimensional space.

The digital three-dimensional space populated with the image data is configured for use by a robotic medical system.

Embodiments include a controller coupled to the helmet and configured to process the image data generated by the X-ray scanner and the image sensor.

The controller is configured to communicate with a remote computer.

A least one of the controller and the remote computer are configured to plan and execute a robotic medical procedure using processed image data.

At least one of the image sensor and the X-ray scanner include high-resolution, three-dimensional image sensors with magnification.

Embodiments include at least one housing coupled to the helmet and configured to house at least one of medical instruments and dental instruments. The at least one housing is configured to be accessible by a robot to automatically obtain the at least one of medical instruments and dental instruments during a robotic medical procedure.

Embodiments include a cartridge coupled to the helmet and configured to retain a medical instrument and position the medical instrument to be accessible by a robot automatically during a robotic medical procedure.

Embodiments include an immobilization component coupled to the helmet and configured to stabilize the helmet and head of the subject during the robotic medical procedure.

The immobilization component is configured to magnetically attach to a chair including the subject during the robotic medical procedure.

Embodiments include a system comprising: a helmet configured to be secured on a subject for use in a robotic medical procedure; a plurality of sensors coupled to the helmet and configured to image a region of the subject; and a housing coupled to the helmet and configured to house medical instruments for automatic access by a robot during a robotic medical procedure.

Embodiments include a system comprising a helmet configured to be secured on a subject for use in a robotic medical procedure. A plurality of sensors is coupled to the helmet and configured to image a region of the subject. A housing is coupled to the helmet and configured to house medical instruments for automatic access by a robot during a robotic medical procedure.

Embodiments include a system comprising: a helmet configured to be secured on a subject for a medical procedure; a plurality of sensors coupled to the helmet and configured to generate image data representing a region of the subject; a controller coupled to the helmet and configured to generate processed image data configured to control a robot during the medical procedure; and a housing coupled to the helmet and configured to house medical instruments for automatic access by the robot during the medical procedure.

Embodiments include a system comprising a helmet configured to be secured on a subject for a medical procedure. A plurality of sensors is coupled to the helmet and configured to generate image data representing a region of the subject. A controller is coupled to the helmet and configured to generate processed image data configured to control a robot during the medical procedure. A housing is coupled to the helmet and configured to house medical instruments for automatic access by the robot during the medical procedure.

It should be observed that the embodiments described in detail herein in accordance with the present invention reside primarily in combinations of method steps and system components related to a dental robot. Accordingly, the system components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

In the foregoing specification, specific embodiments of the present invention have been described. However, one of ordinary skill in the art appreciates that various modifications and changes can be made without departing from the scope of the present invention as set forth in the claims below. The numerical values cited in the specific embodiment are illustrative rather than limiting. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims.

What is claimed is:

1. A system comprising:
   a helmet;
   an image sensor coupled to the helmet and configured to image a region of a subject;
   an X-ray scanner coupled to the helmet and configured to collect panoramic images of the region; and
   at least one fitting coupled to the helmet and configured to couple to at least one remote system providing at least one of air, water, and vacuum.

2. The system of claim 1, wherein the helmet is configured to be secured on a head of a subject for use in a robotic medical procedure, wherein the helmet includes a plurality of apertures configured for placement adjacent a plurality of features of the head including at least one of eyes, ears, and a mouth.

3. The system of claim 2, comprising at least one pad configured to couple to the helmet to immobilize the head relative to the helmet.

4. The system of claim 2, wherein the at least one pad comprises an inflatable pad coupled to a pressure source, wherein the pressure source is configured to control an inflation pressure of the at least one pad.

5. The system of claim 2, wherein the at least one pad comprises a gel pad.

6. The system of claim 2, comprising a brace coupled to the helmet and configured to immobilize a jaw of the subject relative to the helmet.

7. The system of claim 1, wherein the region includes a face and mouth of the subject, wherein the mouth includes internal regions and structures of the mouth.

8. The system of claim 7, wherein the X-ray scanner and the image sensor are configured to generate image data representing the mouth and the face of the subject, wherein the image data are configured to populate a digital three-dimensional space.

9. The system of claim 8, wherein the digital three-dimensional space populated with the image data is configured for use by a robotic medical system.

10. The system of claim 8, comprising a controller coupled to the helmet and configured to process the image data generated by the X-ray scanner and the image sensor.

11. The system of claim 10, wherein the controller is configured to communicate with a remote computer.

12. The system of claim 11, wherein at least one of the controller and the remote computer are configured to plan and execute a robotic medical procedure using processed image data.

13. The system of claim 1, wherein at least one of the image sensor and the X-ray scanner include high-resolution, three-dimensional image sensors with magnification.

14. The system of claim 1, comprising at least one housing coupled to the helmet and configured to house at least one of medical instruments and dental instruments, wherein the at least one housing is configured to be accessible by a robot to automatically obtain the at least one of medical instruments and dental instruments during a robotic medical procedure.

15. The system of claim 1, comprising a cartridge coupled to the helmet and configured to retain a medical instrument and position the medical instrument to be accessible by a robot automatically during a robotic medical procedure.

16. The system of claim 1, comprising an immobilization component coupled to the helmet and configured to stabilize the helmet and head of the subject during the robotic medical procedure.

17. The system of claim 16, wherein the immobilization component is configured to magnetically attach to a chair including the subject during the robotic medical procedure.

18. A system comprising:
   a helmet configured to be secured on a subject for use in a robotic medical procedure;
   a plurality of sensors coupled to the helmet and configured to image a region of the subject; and
   a housing coupled to the helmet and configured to house medical instruments for automatic access by a robot during a robotic medical procedure.

19. A system comprising:
   a helmet configured to be secured on a subject for a medical procedure;

a plurality of sensors coupled to the helmet and configured to generate image data representing a region of the subject;

a controller coupled to the helmet and configured to generate processed image data configured to control a robot during the medical procedure; and a housing coupled to the helmet and configured to house medical instruments for automatic access by the robot during the medical procedure.

* * * * *